(12) United States Patent  (10) Patent No.: US 8,922,530 B2
Pance  (45) Date of Patent: Dec. 30, 2014

(54) COMMUNICATING STYLUS

(75) Inventor: Aleksandar Pance, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 817 days.

(21) Appl. No.: 12/683,255

(22) Filed: Jan. 6, 2010

(65) Prior Publication Data

US 2011/0164000 A1  Jul. 7, 2011

(51) Int. Cl.
G06F 3/033 (2013.01)
G06F 3/038 (2013.01)
G06F 3/0354 (2013.01)

(52) U.S. Cl.
CPC .............. *G06F 3/038* (2013.01); *G06F 3/03545* (2013.01); *G06F 2203/0384* (2013.01)
USPC ........................................................ 345/179

(58) Field of Classification Search
CPC ................ G06F 3/03545; G06F 3/038; G06F 2203/0383; G06F 2203/0384
USPC .............. 345/156–184, 104; 178/18.01–20.04
See application file for complete search history.

(56) References Cited

U.S. PATENT DOCUMENTS

| | | |
|---|---|---|
| 4,318,096 A | 3/1982 | Thornburg et al. |
| 4,695,680 A | 9/1987 | Kable |
| 4,761,089 A | 8/1988 | Kurihara et al. |
| 4,814,552 A | 3/1989 | Stefik et al. |
| 4,859,080 A | 8/1989 | Titus et al. |
| 4,883,926 A | 11/1989 | Baldwin |
| 5,247,137 A * | 9/1993 | Epperson .................... 178/19.04 |
| 5,317,105 A | 5/1994 | Weber |
| 5,342,991 A | 8/1994 | Xu et al. |
| 5,434,371 A * | 7/1995 | Brooks ....................... 178/19.04 |
| 5,581,052 A | 12/1996 | Padula et al. |
| 5,600,348 A | 2/1997 | Bartholow et al. |
| 5,736,687 A | 4/1998 | Sellers |
| 5,770,898 A | 6/1998 | Hannigan et al. |
| 5,831,601 A | 11/1998 | Vogeley et al. |
| 5,914,708 A | 6/1999 | LaGrange et al. |
| 5,975,953 A | 11/1999 | Peterson |
| 6,050,735 A | 4/2000 | Hazzard |
| 6,081,261 A | 6/2000 | Wolff et al. |
| 6,130,666 A * | 10/2000 | Persidsky ....................... 345/179 |
| 6,188,392 B1 | 2/2001 | O'Connor et al. |
| 6,650,320 B1 | 11/2003 | Zimmerman |
| 6,713,672 B1 | 3/2004 | Stickney |
| 6,717,073 B2 | 4/2004 | Xu et al. |
| 6,800,805 B2 | 10/2004 | Deguchi |

(Continued)

FOREIGN PATENT DOCUMENTS

| | | |
|---|---|---|
| GB | 2445362 | 7/2008 |
| KR | 20030035305 | 5/2003 |

*Primary Examiner* — Patrick F Marinelli

(57) ABSTRACT

A stylus for writing on any type of surface, such as a piece of paper or a whiteboard and subsequently displaying the written images or text on a display of a digital computing device. The stylus may likewise be moved in three-dimensional space and corresponding images displayed on a display of a computing device. The stylus tracks its different positions while a user is writing or drawing and then either stores the data to be uploaded later or transmits the data simultaneously to a computing device. The computing device then displays the images and text drawn on the surface. The computing device may be located anywhere, as long as it is able to communicate with the stylus, and be able to display the written text or images.

26 Claims, 5 Drawing Sheets

(56) References Cited

U.S. PATENT DOCUMENTS

| | | | |
|---|---|---|---|
| 6,906,703 | B2 | 6/2005 | Vablais et al. |
| 6,914,596 | B2 | 7/2005 | Liu et al. |
| 6,933,933 | B2 * | 8/2005 | Fleming ............... 345/179 |
| 7,027,041 | B2 * | 4/2006 | Nishimura et al. ........ 345/178 |
| 7,068,262 | B2 | 6/2006 | Perkins et al. |
| 7,131,724 | B2 | 11/2006 | King et al. |
| 7,310,091 | B2 | 12/2007 | Liu et al. |
| 7,330,590 | B2 | 2/2008 | Seto et al. |
| 7,470,866 | B2 | 12/2008 | Dietrich et al. |
| 7,473,139 | B2 | 1/2009 | Barringer et al. |
| 7,477,242 | B2 | 1/2009 | Cross et al. |
| 7,486,823 | B2 | 2/2009 | Wang et al. |
| 7,489,308 | B2 | 2/2009 | Blake et al. |
| 7,511,705 | B2 | 3/2009 | Silk et al. |
| 7,612,767 | B1 | 11/2009 | Griffin et al. |
| 7,646,379 | B1 | 1/2010 | Drennan et al. |
| 7,671,837 | B2 | 3/2010 | Forsblad et al. |
| 7,671,845 | B2 | 3/2010 | Keely |
| 7,830,160 | B2 | 11/2010 | Philipp |
| 7,976,226 | B2 | 7/2011 | Jeon et al. |
| 8,023,079 | B2 | 9/2011 | Chen et al. |
| 8,063,322 | B2 | 11/2011 | Katsurahira |
| 8,089,474 | B2 | 1/2012 | Geaghan et al. |
| 8,094,325 | B2 | 1/2012 | Silverbrook |
| 8,130,212 | B2 | 3/2012 | Umeda |
| 8,212,795 | B2 | 7/2012 | Henry et al. |
| 8,259,090 | B2 | 9/2012 | Chiang et al. |
| 8,297,868 | B2 | 10/2012 | Underwood et al. |
| 8,536,471 | B2 | 9/2013 | Stern et al. |
| 2002/0067350 | A1 * | 6/2002 | Ben Ayed ............... 345/179 |
| 2002/0158854 | A1 | 10/2002 | Ju |
| 2002/0180714 | A1 * | 12/2002 | Duret ............... 345/179 |
| 2003/0214490 | A1 | 11/2003 | Cool |
| 2004/0140962 | A1 * | 7/2004 | Wang et al. ............ 345/179 |
| 2004/0238195 | A1 | 12/2004 | Thompson |
| 2005/0110777 | A1 | 5/2005 | Geaghan et al. |
| 2005/0110778 | A1 * | 5/2005 | Ben Ayed ............... 345/179 |
| 2005/0156915 | A1 * | 7/2005 | Fisher ............... 345/179 |
| 2005/0162411 | A1 | 7/2005 | van Berkel |
| 2005/0206628 | A1 | 9/2005 | Bich et al. |
| 2005/0212766 | A1 * | 9/2005 | Reinhardt et al. ........ 345/157 |
| 2006/0042820 | A1 | 3/2006 | Lin et al. |
| 2006/0087496 | A1 * | 4/2006 | Maciejewski ............ 345/173 |
| 2006/0139338 | A1 * | 6/2006 | Robrecht et al. ........ 345/175 |
| 2007/0046654 | A1 * | 3/2007 | Tomiya ............... 345/179 |
| 2007/0076953 | A1 | 4/2007 | Gonzalez et al. |
| 2007/0085842 | A1 | 4/2007 | Pilu |
| 2007/0123165 | A1 | 5/2007 | Sheynman et al. |
| 2007/0188477 | A1 * | 8/2007 | Rehm ............... 345/179 |
| 2007/0236474 | A1 | 10/2007 | Ramstein |
| 2007/0285405 | A1 | 12/2007 | Rehm |
| 2008/0036734 | A1 | 2/2008 | Forsblad et al. |
| 2008/0150917 | A1 | 6/2008 | Libbey et al. |
| 2008/0150921 | A1 * | 6/2008 | Robertson et al. ........ 345/204 |
| 2008/0278443 | A1 | 11/2008 | Schelling et al. |
| 2008/0309621 | A1 * | 12/2008 | Aggarwal et al. ........ 345/173 |
| 2009/0009489 | A1 | 1/2009 | Lee |
| 2009/0032313 | A1 | 2/2009 | Silverbrook et al. |
| 2009/0036176 | A1 | 2/2009 | Ure |
| 2009/0167702 | A1 | 7/2009 | Nurmi |
| 2009/0173533 | A1 | 7/2009 | Brock et al. |
| 2009/0173534 | A1 | 7/2009 | Keiper et al. |
| 2009/0176391 | A1 | 7/2009 | Brock et al. |
| 2009/0236153 | A1 | 9/2009 | Kyung et al. |
| 2009/0251338 | A1 | 10/2009 | Marggraff et al. |
| 2010/0006350 | A1 | 1/2010 | Elias |
| 2010/0044067 | A1 | 2/2010 | Wong et al. |
| 2010/0170726 | A1 | 7/2010 | Yeh et al. |
| 2010/0271312 | A1 * | 10/2010 | Alameh et al. ........... 345/173 |
| 2010/0315384 | A1 | 12/2010 | Hargreaves et al. |
| 2011/0162894 | A1 | 7/2011 | Weber |
| 2011/0164000 | A1 | 7/2011 | Pance |
| 2011/0273376 | A1 | 11/2011 | Dickinson et al. |
| 2011/0285670 | A1 | 11/2011 | Li et al. |
| 2011/0291986 | A1 | 12/2011 | Rebeschi et al. |
| 2012/0062497 | A1 | 3/2012 | Rebeschi et al. |
| 2012/0098798 | A1 | 4/2012 | Lee |
| 2012/0113065 | A1 | 5/2012 | Chin |
| 2012/0127110 | A1 | 5/2012 | Amm et al. |
| 2012/0228039 | A1 | 9/2012 | Hinson et al. |
| 2013/0009907 | A1 | 1/2013 | Rosenberg et al. |
| 2013/0050080 | A1 * | 2/2013 | Dahl et al. ............ 345/158 |
| 2013/0135220 | A1 | 5/2013 | Alameh et al. |
| 2014/0078070 | A1 | 3/2014 | Armstrong-Muntner |
| 2014/0078109 | A1 | 3/2014 | Armstrong-Muntner |

* cited by examiner

COMMUNICATING STYLUS

CROSS-REFERENCE TO RELATED APPLICATIONS

This application incorporates co-pending application titled "Stylus for Touch Sensing Devices," identified as Ser. No. 12/683,287 and filed on Jan. 6, 2010, as if set forth herein in its entirety.

TECHNICAL FIELD

Embodiments relate generally to input apparatuses for computing devices, and more particularly to a stylus used for entering data into a computing device.

BACKGROUND

There are a number of different options for entering data into a computing device, including keyboards, mice, styluses, touchscreens, and so on. Some touchscreen computing devices, such as cellular phones, tablet devices and personal digital assistants, allow a user to use his finger to enter data. Other types of computing devices also allow a user to enter data using a resistive-tip plastic stylus. However, styli currently used for entering data with a touch-screen computing device typically require that the tip of the stylus actually contact (or very nearly contact) the touchscreen or another type of specialized surface. The problem with these different types of styli is that they all require that the user write on a specialized surface, whether it be the actual screen of the computing device or specialized paper. There is a need for a stylus that can enter data into a computing device, regardless of the surface with which it is used.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One embodiment is a stylus that includes a position sensing device such as an accelerometer, a tip for writing, a transmitter for sending position data, a receiver and a computing device. The stylus may be used for entering data into the computing device without actually touching the device nor requiring any specialized paper. Rather, the stylus is able to enter data into the computing device, corresponding to images or text drawn draw on any surface. Additionally, the stylus can enter the data from a distance, such as from across the room, to the computing device. This allows a user in one embodiment to keep the computing device stored, for example with a cellular phone, in his pocket and still be able to use the stylus to enter text or drawings into the device. This makes it easy, for example, in a classroom setting for a user to take handwritten notes and simultaneously create a digital version of those notes. Additionally, in another embodiment, the stylus allows for the user to write on a whiteboard mounted on a wall and simultaneously display what he has written on a computing device.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Embodiments disclosed herein may take the forms of systems, apparatuses, and methods for a wirelessly communicating stylus. In one embodiment, a user may use such a stylus to write or draw on a surface. The stylus may activate by being pressed against a surface, grasped, withdrawn from a dock or manually turned on by the user. As the stylus is used and moved, it tracks its position and changes thereto, typically with respect to an initial or zero point. This allows the stylus to gather data that will enable a computing device to display a graphical representation of the stylus' movements.

As the stylus moves, one or more accelerometers may track the position and relative motion of a tip of the stylus. The stylus may store the output of the accelerometer(s) as position data for a period of time; position data may be transmitted in bursts to an associated computing device. It should be noted that the use of multiple accelerometers may permit the stylus to track three-dimensional motion as opposed to tracking only two-dimensional motion. It should also be noted that the stylus may continuously transmit position data rather than transmitting such data in bursts.

Generally, after either a certain time elapses or a certain amount of data is gathered, the stylus may transmit this position data to a receiver associated with a computing device. The computing device may be located anywhere, as long as the receiver is able to receive the position data from the stylus. For instance, the computing device may be located in the user's pocket or across the room from the user. The computing device, after receiving the position data, processes the position data and then displays corresponding images on an associated display such as a monitor, television, mobile phone or tablet surface, other computer screen and so on. For example, the device may show a line or trail on a screen that corresponds to the motion of the stylus. This allows the user to simultaneously take notes (or otherwise draw/write,) on a sheet of surface, or even in the air, and create a separate digital copy of his work.

In this manner, the stylus may be moved and the motions depicted on a display associated with the computing device. In short, the stylus may track its motion, relay position data created by this motion to a computing device, and the computing device may render on a display graphic(s) mirroring the stylus motion. Thus, as a user moves the stylus to write on a surface (or even in air), the writing may be shown on a display.

Figure 1:
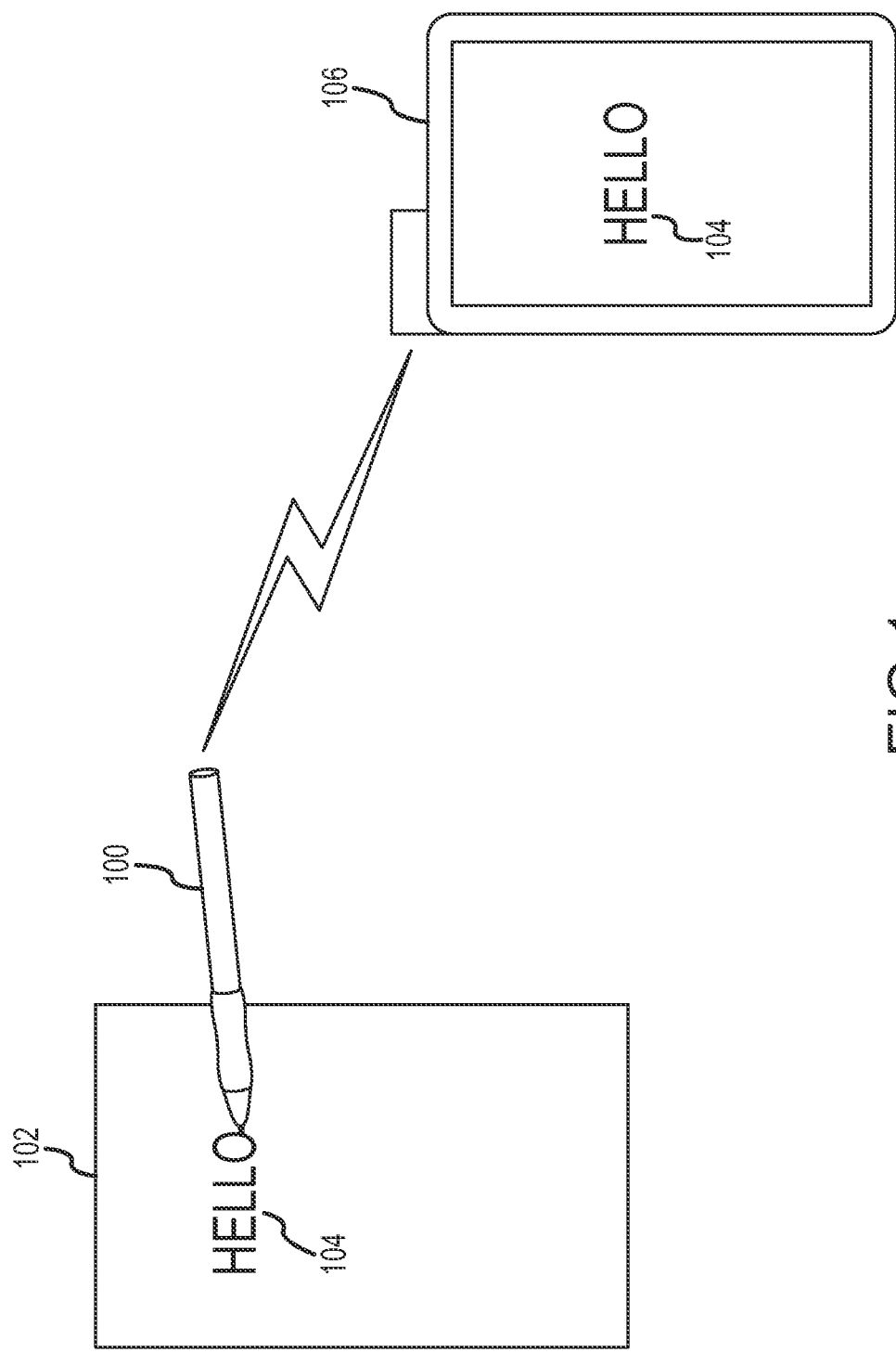
FIG. 1 illustrates one embodiment of a stylus.

Referring now to FIG. 1, in one embodiment the stylus 100 is used to write text 104 on a surface 102. The stylus 100 tracks its movements and then transmits the position information corresponding to the text 104 written on the surface 102, to the computing device 106. The computing device 106 receives the position data, processes the position data and displays the text 104.

A tip of the stylus 100 may be placed against a surface 102, such that the stylus may move across the surface to create corresponding writing, images, letters and so forth on a display of the computing device. The surface 102 may be any type of surface, such as a sheet of paper, whiteboard, chalkboard, electronic screen or the like. The surface 102 may or may not be able to display the text 104, depending on properties of both the surface and stylus. For instance the stylus 100 may not include any ink or other medium that is left behind on the surface. In such an embodiment, text 104 and/or images is typically only displayed on the computing device after the corresponding position data has been transmitted and processed. In another embodiment, the stylus 100 may include ink, graphite, or another similar substance, such that motion of the stylus across the surface 102 will leave the substance behind. In this manner, the surface may display markings left by the motion of the stylus; these same motions may be shown on a display associated with the computing device 106 once position data is received and processed by the computing device.

In addition, it should be noted that the angle of the surface 102 is irrelevant, at least with respect to the creation and transmission of position data, as well as the display of any markings corresponding to motions of the stylus. For instance, the surface 102 may be located horizontally on a desk, positioned vertically on a wall, or the like.

As previously mentioned, the computing device 106 receives position data from the stylus 100, processes the data and displays corresponding text or drawings drawn with the stylus 100. The computing device 106 may be any device capable of receiving data, processing data and displaying an output. For instance, the computing device 106 may be a computer, a personal digital assistant, a cellular telephone, or tablet laptop computer. The computing device 106 may include an integrated receiver or may use an external receiver in electronic communication with the computing device 106, in order to receive the position data from the stylus 100. The receiver may be any device capable of receiving an electronic signal, such as a radio wave or infrared signal, or the like. See FIG. 6 for a more detailed explanation of what may be included in the computing device.

Figure 2:
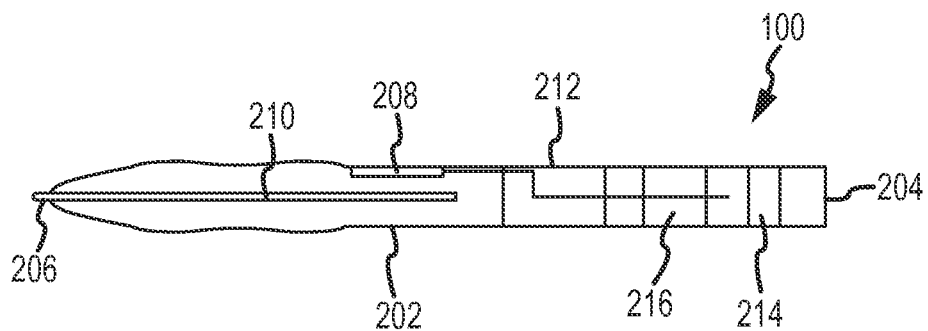
FIG. 2 illustrates a perspective cross-sectional view of the embodiment of FIG. 1.

Referring now to FIG. 2, the stylus 100 may include a body 202, a position sensing device 204, a tip 206, a switch 208, an ink tube 210, a power source 212, a transmitter 214 and memory 216. One or more of these elements may be omitted in certain embodiments. For example, the memory may be omitted in some embodiments and the transmitter may operate continuously when the stylus is in use.

The body 202 is held by the user to write or draw on the surface 102 with the stylus 100. The body 202 may be either hollow, solid or partially solid and may be made from any type of material, for instance, plastic, metal or wood. The elements shown as within the body 202 may reside within the body 202 if the body 202 is hollow, as illustrated by FIG. 2. Alternatively, the elements may reside on the outside of the body 202, for instance as a clip-on or other attachment to the body 202. As one example, the position sensing device 204, power source 212, transmitter 214 and/or memory may be enclosed is a separate housing and attached to the body 202. Similarly, certain elements may be within the body and others outside the body, with interior and exterior elements connected as necessary. As another example, the transmitter and memory may be within the body while a power source is external thereto, and connected by a USB or other connector to the internal elements.

The position sensing device 204 tracks the position of the stylus 100, and particularly the tip, as it is used to write or draw on the surface 102. The position sensing device 204 may be located anywhere on the body 202 of the stylus 100 but is often located at or proximate the tip in order to more easily track tip motion. The position sensing device 204 may be any type of device able to determine and/or track the position of an object, such as an accelerometer.

In certain embodiments, one or more infrared, radio wave, ultrasonic and or other frequency transmitters may be used. In an embodiment employing a frequency transmitter as a position sensing device, the associated computing device 104 may be provided with multiple receivers (not shown). The transmitted position data may be time stamped or otherwise encoded. In this manner, the position data may be received at each receiver. The encoding may be used to establish a difference between time of receipt at each receiver. By comparing the difference in time of receipt and knowing the relative positions of the receivers, the position of the stylus may be determined. This process may be done on a continual basis, for each portion of a packet of position data, to establish motion of the stylus.

The position sensing device 204 may consist of multiple devices. For instance, another embodiment may use two position sensing devices, as described below with respect to FIG. 3. The position sensing device 204 may be located anywhere on the body 202, or as discussed with respect to the body 202, may be provided as a separate attachment. The position sensing device 204 is used to track the different positions of the stylus 100 as a user writes or draws on any surface. In certain embodiments, the position sensing device is located at or near the tip 206 of the stylus. When a second position sensing device is used (as discussed below with respect to FIG. 3), in certain embodiments it may be placed at the end of the stylus opposite the tip.

The tip 206 is the end of the stylus that makes contact with the surface 102 as the user writes. The tip 206 is connected to the body 202 of the stylus 100 at the front end. The tip 206 may be any material, such as graphite, lead, metal, plastic, felt or the like. Additionally, the tip 206 may consist of any shape, such as a ball, a point or the like. The tip 206 material is determined based on the surface 102 on which the stylus 100 will be used. For example, if the stylus 100 is intended to be used with a sheet of paper, the tip 206 may be a graphite point, a lead point, or a rolling ball connected to an ink well. This enables the user to draw/write with the stylus as he would with a pencil or ink pen. If, on the other hand, the stylus is designed to interact with an electronic screen such as a tablet personal computer, the tip 206 may be a sphere or partial sphere made of metal, plastic, an elastomer impregnated with metallic flecks to provide capacitance, and so on. The tip 206 may enable the user's writing to be displayed on the tablet laptop computer screen as well as the screen of the computing device 106, either through capacitive coupling with the screen or resistive operation. Furthermore, multiple tips 206 may be available for a single stylus. For instance, a switch could be placed on the body 202 of the stylus 100 that permits a user to rotate between multiple tips 206.

The switch 208 is used to activate the power source 212 of the stylus 100, and may be omitted in certain embodiments. The switch 208 may be located anywhere on the stylus 100. The switch 208 may be any device capable of having at least two states, for instance "on" and "off." However, the switch 208 may be more than just a toggle switch. In one embodiment the switch 208 may be a pressure sensing device. In this embodiment the switch 208 may be toggled to a second position when the user depresses the tip 206 of the stylus 100. This may allow the stylus 100 to conserve power by only operating certain elements in certain circumstances, such as operating the transmitter 214 and power source 212 only when the user is using the stylus 100. In another embodiment, the switch 208 may be activated manually by the user. In this embodiment the user could determine when the stylus 100 should be capturing his writing and would allow the stylus to function as a plain writing instrument as well as a communicative stylus.

In some embodiments omitting the switch 208, the stylus 100 may be activated when it is withdrawn from a dock or separated from the computing device. For example, the computing device and/or stylus may detect when the stylus is separated (or when the stylus is removed from an associated dock). When this is detected, the stylus may be activated and the computing device may enter a data reception mode.

Generally, actuating the switch may not only activate the stylus 100, but also set an initial coordinate or zero point for the position data. That is, position coordinates may be set to zero (or some other default value) every time the stylus is initiated. In this manner, the position sensing device may track motion of the stylus relative to the zero point and transmit this information to the computing device. The use of a zero point or initial coordinate permits the position data to be measured relative to the zero point, rather than measured relative to the position of the computing device or any other fixed, absolute position.

The ink tube 210 provides the ink or other pigment-type elements to the tip 206, so that the stylus 100 is able to display what is being written by the user on the surface 102. The ink tube 210 may be located anywhere on the stylus 100, and may likewise be omitted completely. The ink tube 210 may be any type of material capable of displaying on a surface, for instance, ink, graphite, lead, or paint. The ink tube 210 material depends on the type of tip 206. For example, if the tip 206 is a ball point, then the ink tube 210 will be a plastic tube filled with ink to provide ink to the ball. On the hand, if the tip 206 is graphite or lead, such as in a pencil, the ink tube 210 may be either a solid piece of either graphite or lead or a tube containing multiple pieces of graphite or lead. Additionally, if the tip 206 is a capacitive element, the ink tube 210 may be omitted from the stylus 100 or may flow around the capactive tip. Also, just as the tip 206 may have a switch to let the user choose the tip 206 material from different options, the ink tube 210 may include multiple tubes for different tip 206 materials. For instance, the ink tube 210 may include red ink, blue ink, and pencil lead/graphite.

The power source 212 provides power to the elements in the stylus 100 which require power, for example the position sensing device 204, the transmitter 214 and the memory 216. The power source 212 may be located anywhere on the stylus 100. The power source 212 may be any device capable of storing and providing electrical current. For instance, the power source 212 may be a battery, such as nickel-cadmium, nickel-metal hydride, lithium ion, polymer, alkaline or lead-acid. In certain embodiments the power source 212 may be a power cord, USB cord or other type of hardwired connection to a power outlet. The power source 212 provides power to the transmitter 214, the memory 216, the position sensing device 204 and any other additional elements which may be added to the stylus that may require a source of power. The power source 212 may be in a constant "on" state or, if the stylus uses a switch 208, may be turned on/off by the switch 208.

The transmitter 214 sends the position data from the stylus 100 to the computing device 106. The transmitter 214 may be located anywhere on the stylus 100. The transmitter 214 may be any device capable of sending data from one location to another. For example, the transmitter may send a modulated signal including the position data created by the position sensing device 204, along with a time stamp or other marker embedded in each datum of the position data. The transmitter 214 may output position data as radio waves, infrared waves, or any other type of signal. In one embodiment the transmitter 214 receives the position data of the stylus 100 from the position sensing device 204, modulates the signal onto a radio frequency wave and transmits the radio wave to the computing device 106.

The memory 216 accumulates and stores the position data from the position sensing device 204 before the data is transmitted to the computing device 106 or until the user uploads the data to a computing device. The memory 216 may be located anywhere on the stylus 100. The memory 216 may be any type of recording medium that can save digital or analog data. For example, magnetic storage, optical storage, volatile or non-volatile, or the like. For instance, the memory 216 may be random access memory (RAM), disk storage, flash memory, solid state memory, or the like. The memory 216 may be configured to receive the position data from the positing sensing device 214 and store the data until the transceiver is ready to transmit the data to the computing device 106. Additionally, the memory 216 may be configured to receive the position data from the position sensing device 204 and store the data, even after the transceiver 214 has transmitted it the computing device 106. This may allow the user to store a copy of his written text 104 on the stylus and upload it later to a separate computing device.

Figure 3:
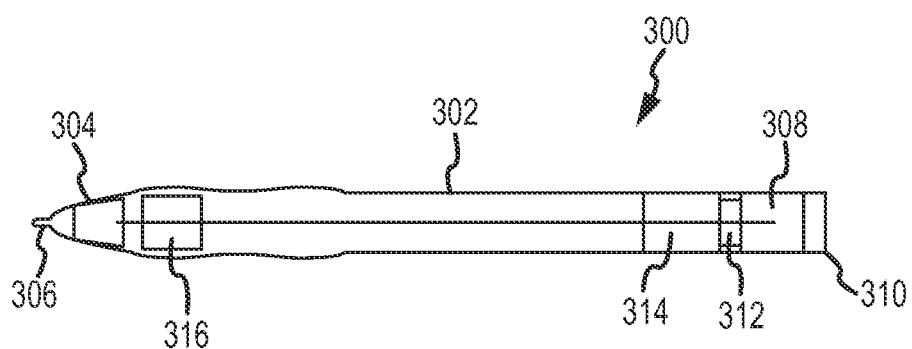
FIG. 3 illustrates a perspective cross-sectional view of a second embodiment of a stylus.

Referring now to FIG. 3, in another embodiment, the stylus 300 includes a body 302, a switch 304, a tip 306, a power source 308, a transmitter 310, memory 312, a first positioning sensing device 314 and at least a second position sensing device 316. In this embodiment the first and second position sensing devices 314, 316 may be used such that the position of the stylus 300 may be determined in three dimensions. That is, the position data collected by both sensing devices may allow the computing device 106 to determine on which surface 102, out of a number of different surfaces, that the stylus is writing. Continuing example, the user could write on one surface, a sheet of paper and at a separate time write on a second surface, a chalkboard. If the chalkboard is positioned at a different location from the sheet of paper, the computing device could display the two writings in different windows or otherwise illustrate on which surface the writing originated.

Typically, when two position sensing devices 314, 316 are used in a single stylus 300, one is placed at or proximate the tip while the other is placed at or proximate the back end 310.

The first and second position sensing devices 314, 316 are used to track the position changes of the stylus 100 in different dimensions. The first and second position sensing devices 314, 316 may be any type of position sensing device as described above, but in certain embodiments take the form of three-axis accelerometers capable of tracking motion in three dimensions. By locating one position sensing device 314 near a back end 310 of the stylus 100 and the second position sensing device 316 near the stylus tip 306, differences in motion between the tip and back may be detected by comparing the position data collected by each position sensing device.

The stylus 100, and its attendant position sensing devices 314, 316, may be calibrated to establish multiple aforementioned zero points in three dimensions as well as in two dimensions. As one example, the stylus may be used to define a plane in three-dimensional space by tapping the four corners of a whiteboard or other surface. Instead of tapping, the switch on the stylus may be activated at each corner or the stylus may be set into a "zero point" mode, in which every activation of the switch (or a separate input) may correspond to a zero point. Once the four corners of the surface are established, the stylus 100 and/or computing device may map these to the four corners of the corresponding display. Further, the stylus may occasionally be recalibrated to either a single or multiple zero points in order to eliminate accumulated positioning error.

In operation and when accelerometers are used as the position sensing devices 314, 316, each position sensing device initially is located at its zero point, which may be defined as a series of Cartesian coordinates (e.g., X0,Y0,Z0). As the stylus moves, the accelerometers generally track changes in speed from this zero point, and, combined with additional appropriate circuitry, may yield differences in position from the zero point (e.g. a delta for each of the X, Y, and Z axes). These changes in speed and/or position are relayed to the computing device as the position data. A receiver on the computing device receives the position data and may be defined as a second point in space (e.g., X1,Y1,Z1). Given the receiver's position and the position data from the first positions sensing device 314, as well as the initial zero point, the location of the stylus may be established and a line calculated between the receiver and the stylus. In this manner, the positioning data may be used to triangulate the location of the stylus relative to the computing device.

Alternatively, because the positioning data includes changes in location from the zero point, triangulation may be omitted and the position data, along with the zero point, may be used to establish the stylus' location relative to the zero point. That is, by using the delta along the X, Y and Z axes included in the position data, the computing device may determine the distance of the stylus from the initially established zero point. In this manner the motion of the stylus may be tracked without triangulation and corresponding markings may be depicted on a display associated with the computing device or stylus.

By using the second position sensing device 316 and its position data, the computing device may establish a plane in which the stylus is located and use the location of the second position sensing device for three-dimensional calculations. Alternatively, a second receiver may be placed in the computing device to provide an additional location point in space and the second position sensing device might be omitted. It should be appreciated, however, that multiple receivers and multiple positioning devices may be employed.

Embodiments have generally been discussed in which the computing device receives position data and performs the calculations necessary to determine the position of the stylus, as well as the operations necessary to depict markings on a display that correspond to motion of the stylus. It should be appreciated that the stylus may include a microprocessor capable of calculating its relative position from the zero point based on the position data accrued by the position sensing device(s). In such an embodiment, the stylus may perform digital signal processing to determine its location and transmit a calculated position as a set of coordinates, such as Cartesian, polar, spherical, cylindrical coordinates and so forth, to the computing device.

Figure 4:
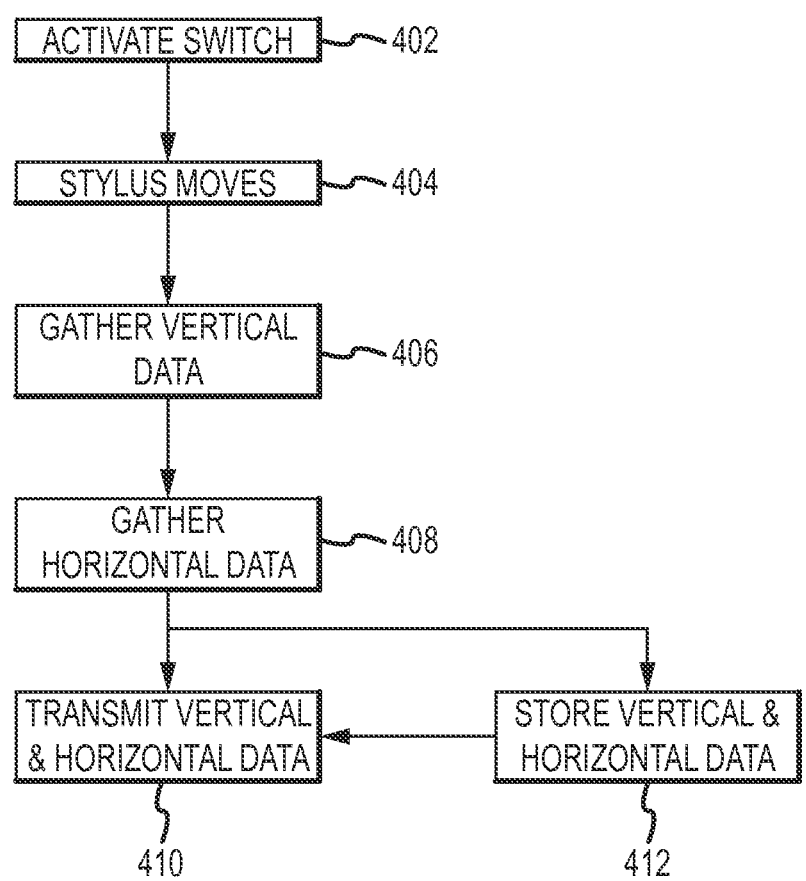
FIG. 4 is a flow chart illustrating a sample method for operating the embodiment of FIG. 1.

FIG. 4 is a flow chart illustrating operation of one embodiment. When the user first begins to use the stylus 100, he activates the switch 208, as illustrated in operation 402. Operation 402 may be accomplished through either the user manually activating the switch 208 or simply beginning to use the stylus 100 and the switch 208 activating automatically. For example, when the switch 208 includes a pressure sensor it may activate when the tip 206 presses down on a surface 102. After the switch 208 has been activated, in operation 404 the position sensing device(s) detect when the stylus moves. For example, a user may move the stylus to write on any type of surface 102, draw any type of picture, write any text, draw a combination of text and pictures and so forth. In operation 406 the position sensing device 204 gathers the vertical movement data of the stylus 100 as the stylus moves. Simultaneously with operation 406, operation 408 may be accomplished. In operation 408 the position sensing device 204 gathers the horizontal data from the horizontal movements of the stylus 100 while the user is writing. It should be noted that the accelerometer or other position sensing device may gather horizontal and vertical data simultaneously, as well as depth data, thus permitting data gathering in three dimensions at once. It should also be noted that this data may be expressed as a motion vector, a set of changes as compared to a prior position, and/or a set of coordinates. Similarly, if the stylus includes multiple position sensing devices, each such device may execute operations 406 and 408 independently of one another.

In operation 410 the stylus 100 transmits the vertical and horizontal data, and optionally depth data, via the transmitter 214. In operation 412 the stylus stores the vertical and horizontal data in the memory 216. However, operation 410 and operation 412 are interchangeable and/or may be omitted. For example, operation 410 may come after operation 412. This would mean that the stylus 100 would gather the horizontal and vertical data (as illustrated in the third and fourth operations 406, 408) and store the horizontal and vertical data as illustrated in the sixth operation 412 and then transmit the data as illustrated in the fifth operation 410. Such transmission may occur at set time intervals. Furthermore, either operation 410 or operation 412 may be omitted. For example, after the stylus 100 completes operation 410 and transmits the vertical and horizontal data the process may be complete. Conversely, the stylus 100 could gather the horizontal and vertical data as required by operation 408 and then proceed to operation 412 without ever executing operation 410. This would allow the stylus 100 to store the horizontal and vertical data in the memory 216 without transmitting said data.

Figure 5:
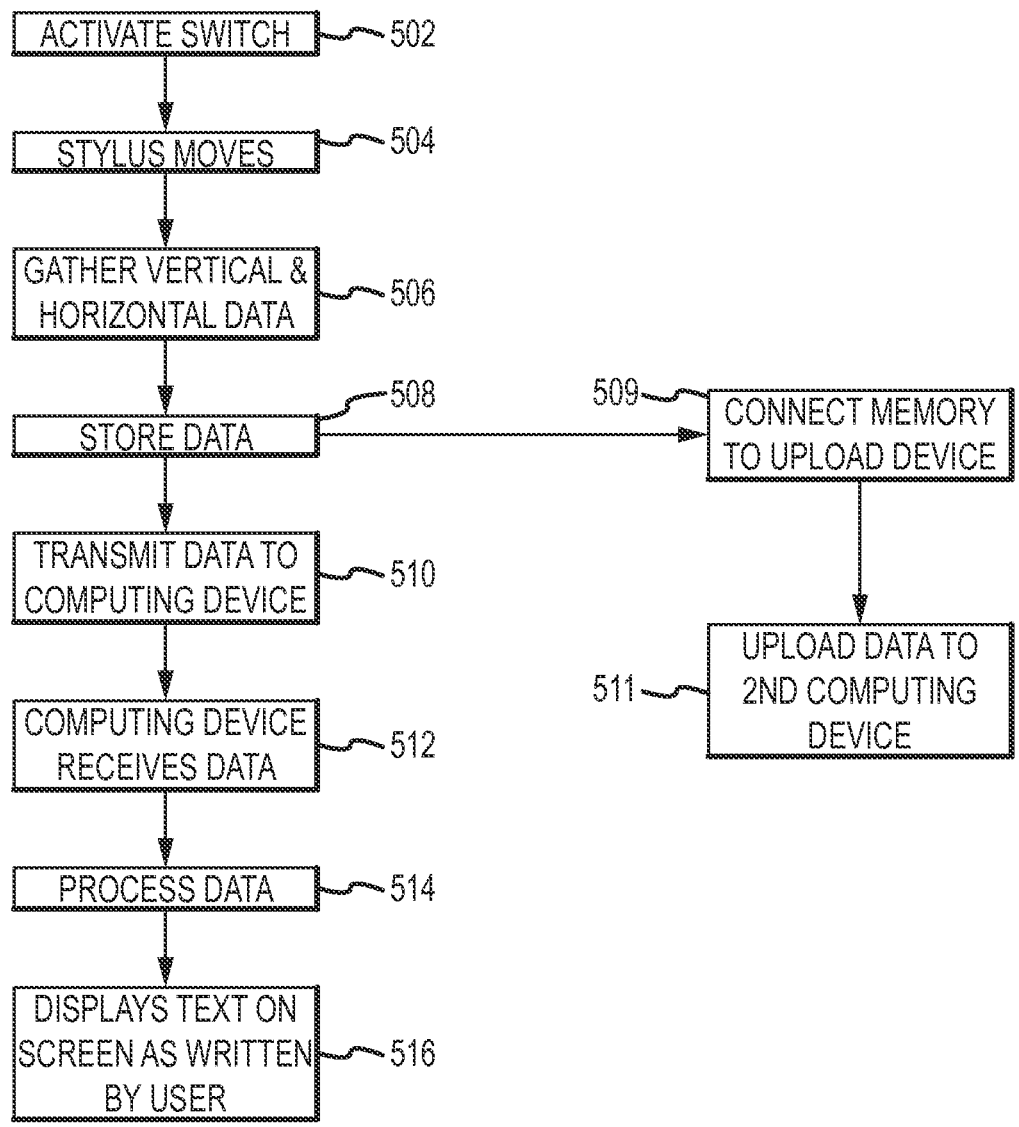
FIG. 5 is a flow chart illustrating a sample method for operating the embodiment of FIG. 2.

FIG. 5 is a flow chart which illustrates another operating method for an embodiment. In operation 502, the switch 208 is activated. As discussed above with respect to FIG. 4, this may be accomplished either manually by the user, or automatically by the switch 208. In operation 504 the stylus is moved and the motion detected by the position sensing device(s). Once again, the user can write on any type of surface and draw any desired combination of shapes, pictures or text. In operation 506 the stylus gathers the position data. This may involve only horizontal and vertical data, or may involve more dimensions, as discussed with respect to FIG. 3. Operation 506 is repeated until the stylus stops moving, optionally at least for a threshold time. In operation 508, the stylus 100 stores the position data. This is accomplished through by the memory 216. Operation 508, however, may be omitted, and the method may proceed directly to Operation 510. Additionally, operation 508 may lead directly to the operation 509.

In operation 510 the stylus 100 transmits the position data to the computing device 106. This is accomplished by the transmitter 214 and may be done after the stylus stops moving or may be done simultaneously as the stylus moves. In operation 512 the computing device 106 receives the position data. This may be accomplished through a receiver integral or external to the computing device 106. In operation 514 the position data is processed by the computing device 106. This may be done by any means, such as a microprocessor or the like. In operation 516 the computing device 106 displays the motions of the stylus as graphical data on an associated screen or other display device. In operation 509 the stylus, and thus the memory 216, is connected to an upload interface. Then, in operation 511 the position data is uploaded to a computing device associated with the upload interface. This would allow the user to upload the data of his drawing/writing onto any desired computing device.

Figure 6:
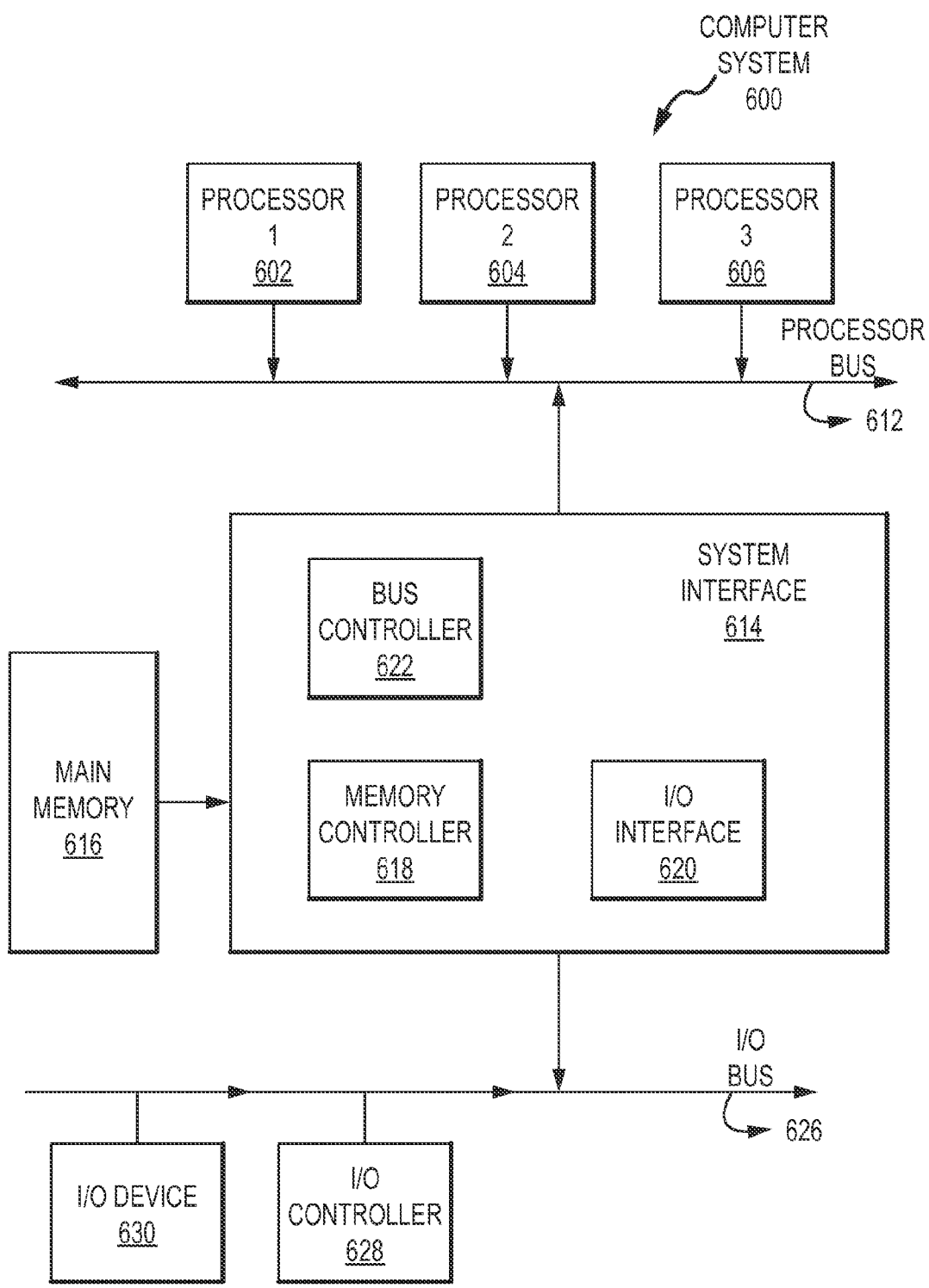
FIG. 6 is a block diagram illustrating a computing system which may be implemented for operation with either the first or second embodiment.

FIG. 6 is a block diagram illustrating an example of a computer system device 600 which may be used in implementing embodiments described herein. In general, the computing device 106 and stylus 100 may include or omit any of the described components. In FIG. 6 the computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as the stylus 100, an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device. Additionally, the I/O device 630 may include a display screen, such as a liquid-crystal, plasma, light emitting diodes, vacuum florescent, surface-conduction electron-emitter display System 600 may include a dynamic storage device, referred to as main memory 616, or a random access memory (RAM) or other devices coupled to the processor bus 612 for storing information and instructions to be executed by the processors 602-606. Main memory 616 also may be used for storing temporary data.

Certain embodiments may include a magnetometer in the stylus 100. The magnetometer may provide orientation data for the stylus. For example, the magnetometer may be located proximate the tip and determine the orientation of the tip with respect to magnetic north. This orientation data may be packaged as part of the position data or may be separately transmitted and/or processed. The orientation data may be used to refine a position of the stylus by providing a magnetic north reference for the stylus tip.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

It should be noted that the flowcharts of FIGS. 4-5 are illustrative only. Alternative embodiments may add operations, omit operations, or change the order of operations without affecting the spirit and scope of the present invention.

The invention claimed is:

1. A stylus comprising:
a body with a first end and a second end;
a tip located at a first end of the body;
one or more position sensors disposed on the body, wherein the position sensor is in communication with the tip; and
a transmitter operative to transmit position data generated by the one or more position sensors to a remote computing device, the position data including zero points established at four corners of a plane defined by the stylus in three-dimensional space for an initial location of the stylus; wherein
the one or more position sensors are one or more accelerometers; and
the position data and a location of the remote computing device are used to:
triangulate a three-dimensional position of the stylus utilizing the zero points; and
map the four corners of the plane to four corners of a display.

2. The stylus of claim 1 wherein the transmitter operates intermittently.

3. The stylus of claim 1 further comprising a memory, wherein the memory is in communication with the position sensor.

4. The stylus of claim 1 further comprising a tube located within the body and connected to the tip, the tube holding an ink.

5. The stylus of claim 1 further comprising a power source, wherein the power source is in communication with the position sensors and the transmitter.

6. The stylus of claim 5 further comprising a switch, wherein the switch is in communication with the power source.

7. The stylus of claim 6 wherein the switch is a pressure sensor.

8. The stylus of claim 1, wherein the three-dimensional position of the stylus is used to determine a location of the stylus relative to the remote computing device.

9. The stylus of claim 1, wherein the plane is unknown to the remote computing device until it receives the zero points used to establish the four corners of the plane.

10. A method for capturing text written by a user, comprising:
actuating a stylus;
establishing zero points at four corners of a plane defined by the stylus in three-dimensional space for an initial location of the stylus;
detecting that the stylus is moving;
measuring the motion of the stylus in at least two dimensions;
creating first position data based at least on a motion of the stylus in at least two dimensions;
transmitting the position data to a remote computing device;
triangulating a three dimensional location of the stylus using the first position data, the zero points, and a location of the remote computing device; and mapping the four corners of the plane to a display in communication with the remote computing device, wherein movement of the stylus in the plane is correlated to an output on the display.

11. The method of claim 10, wherein the first position data is a motion vector generated by an accelerometer.

12. The method of claim 11, wherein the accelerometer is located in a tip of the stylus.

13. The method of claim 12, further comprising:
creating second position data based at least on a motion of a back end of the stylus in at least two dimensions;
transmitting the second position data to the remote computing device.

14. The method of claim 13, wherein the first and second position data are based on the motion of the stylus in three dimensions.

15. The method of claim 10,
wherein the zero points are established prior to detecting that the stylus is being moved.

16. The method of claim 10, wherein the three-dimensional location of the stylus is determined at substantially any angle of the stylus relative to the remote computing device.

17. The method of claim 10, wherein establishing the zero points includes
activating an input to the stylus.

18. The method of claim 17, wherein activating an input comprises tapping the stylus at the four corners of the plane.

19. The method of claim 17, wherein activating the input comprises selecting a switch on the stylus at the four corners of the display.

20. A system for entering data, comprising:
a stylus comprising:
a body;
a tip;
at least one or more position sensors, wherein a first position sensor tracks the position of the tip and produces position data including zero points established at four corners of a plane defined by the stylus in three-dimensional space for an initial location of the stylus;
a transmitter, in communication with the position sensor, operative to transmit the position data; and
a power source in communication with the position sensor and the transmitter; and
a computing device comprising:
a receiver operative to receive the position data from the transmitter;
a processor in communication with the receiver, the processor operative to:
receive the position data and process it along with a location of the computing device to triangulate a three-dimensional position of the tip;
determine the four corners of the plane in three-dimensional space established by the stylus;
map the four corners of the plane in three-dimensional space to a display; and
the display in communication with the processor, and depicting graphics corresponding to a motion of the tip, wherein the depicted graphics are depicted in a location mapped to a location of the motion of the tip in the plane in three-dimensional space.

21. The system of claim 12 wherein the position sensor is an accelerometer.

22. The system of claim 21, further comprising a magnetometer, wherein the magnetometer operates in conjunction with the accelerometer to provide position data.

23. The system of claim 22, wherein the position data includes orientation data.

24. The system of claim 22, wherein the processor employs the position data to determine a motion of the stylus.

25. The system of claim 20 wherein the stylus further comprises a memory in communication with the position sensor, the power source and the transmitter.

26. The system of claim 20 further comprising a pressure sensor in communication with the power source and operative to activate the position sensor.

* * * * *

UNITED STATES PATENT AND TRADEMARK OFFICE
CERTIFICATE OF CORRECTION

| | |
|---|---|
| PATENT NO. | : 8,922,530 B2 |
| APPLICATION NO. | : 12/683255 |
| DATED | : December 30, 2014 |
| INVENTOR(S) | : Aleksandar Pance |

Page 1 of 1

It is certified that error appears in the above-identified patent and that said Letters Patent is hereby corrected as shown below:

In the Claims

In claim 21, column 12, line 24, delete "system of claim 12" and insert --system of claim 20--.

Signed and Sealed this
Twenty-first Day of July, 2015

Michelle K. Lee
*Director of the United States Patent and Trademark Office*